(12) United States Patent
Guerra et al.

(10) Patent No.: US 10,546,052 B2
(45) Date of Patent: Jan. 28, 2020

(54) STRUCTURED TOUCH SCREEN INTERFACE FOR MOBILE FORMS GENERATION FOR CUSTOMER RELATIONSHIP MANAGEMENT (CRM)

(71) Applicant: SugarCRM Inc., Cupertino, CA (US)

(72) Inventors: Filipe Guerra, San Jose, CA (US); Vladyslav Kulchytskyy, Nashua, NH (US)

(73) Assignee: SUGARCRM INC., Cupertino, CA (US)

( * ) Notice: Subject to any disclaimer, the term of this patent is extended or adjusted under 35 U.S.C. 154(b) by 157 days.

(21) Appl. No.: 14/881,089

(22) Filed: Oct. 12, 2015

(65) Prior Publication Data
US 2017/0103053 A1   Apr. 13, 2017

(51) Int. Cl.
G06F 17/20 (2006.01)
G06F 17/24 (2006.01)
G06F 3/0488 (2013.01)

(52) U.S. Cl.
CPC ........ G06F 17/243 (2013.01); G06F 3/04883 (2013.01)

(58) Field of Classification Search
CPC . G06F 3/04883; G06F 17/243; G06F 3/03545
See application file for complete search history.

(56) References Cited

U.S. PATENT DOCUMENTS

| | | | | |
|---|---|---|---|---|
| 4,656,317 A * | 4/1987 | Tsugei | ............ | G06F 3/033 178/18.01 |
| 4,823,283 A * | 4/1989 | Diehm | ............ | G01R 1/025 345/902 |
| 5,594,471 A * | 1/1997 | Deeran | ............ | G06F 3/04886 178/18.03 |
| 5,903,667 A * | 5/1999 | Kuzunuki | ......... | G06F 3/04883 382/187 |
| 6,144,371 A * | 11/2000 | Clary | ............ | G06F 3/03545 345/173 |
| 6,438,584 B1 * | 8/2002 | Powers | ............ | G06Q 10/107 358/402 |
| 6,456,740 B1 * | 9/2002 | Carini | ............ | G06K 9/2054 178/18.01 |

(Continued)

Primary Examiner — Shahid K Khan
(74) Attorney, Agent, or Firm — Steven M. Greenberg, Esq.; Shutts & Bowen LLP

(57) ABSTRACT

A method, system and computer program product for touch screen interface utilization during forms generation in a CRM system is provided. The method includes logically subdividing into different discrete portions, a touch screen of a mobile computing device and associating each with a particular record field for a multiplicity of different records in the CRM system. The method also includes selecting a particular one of the different records through the touch screen and receiving handwritten input on the touch screen and converting the handwritten input into computer recognizable text. Thereafter, the computer recognizable text is provided as text input to a field of the selected record corresponding to a portion of the touch screen in which the handwritten input is received. Finally, the method includes generating and displaying in the touch screen a form utilizing the text input of the field of the record in the CRM system.

9 Claims, 2 Drawing Sheets

(56) References Cited

U.S. PATENT DOCUMENTS

2006/0007189 A1* 1/2006 Gaines, III ............ G06F 17/243
                                                    345/179
2007/0129993 A1* 6/2007 Alvin .................... G06Q 30/02
                                                    705/7.32
2007/0291017 A1* 12/2007 Syeda-Mahmood ........................
                                                    G06K 9/2054
                                                    345/179

* cited by examiner

STRUCTURED TOUCH SCREEN INTERFACE FOR MOBILE FORMS GENERATION FOR CUSTOMER RELATIONSHIP MANAGEMENT (CRM)

BACKGROUND OF THE INVENTION

Field of the Invention

The present invention relates to forms generation for CRM and more particularly to mobile forms generation in a CRM system.

Description of the Related Art

The widespread enablement of mobile computing has revolutionized the way in which individuals are able to interact with enterprise computing systems even while remote or during travels. For traveling corporate representatives in particular, mobile computing enables the roving sales force to constantly interact with backend computing systems and to dynamically collect data irrespective of location. Mobile computing is particularly enabling in the collection of data pertinent to a meeting at a time most contemporaneous to the occurrence of the meeting without the need for any delays in returning to the home office. In doing so, customer response time and follow up are dramatically improved.

Principally, the tasks associated with follow up after a meeting has occurred in the field include form generation. A typical form to be generated after a meeting is a form driven follow up message to one or more participants to the meeting, or a quotation to be presented to one or more participants to the meeting, or a sales order for goods or services to be transmitted to one or more participants to the meeting. When managed by a CRM system, the process of generating such a form includes first the generation of data in the CRM system and the use of this data as input to a form template ultimately to result in a desired document such as a quote, message or order.

Generally, the remote collection of data for a CRM system on a mobile device for the purpose of form generation requires either the presence on the mobile device of a client application enabled to interact with the CRM system, or a Web browser through which a Web interface to the CRM system is presented. In either case, through the CRM system, data entry is effectuated. However, the typical interface to a CRM system whether through the Web or through a dedicated CRM client is highly structured and at times, complex. A high degree of structure and complexity in a user interface to a CRM client on a mobile device, though, does not lend itself well to the fast moving, free flowing nature of data collection after a meeting where only a few data elements are required to be recorded so as to generate some sort of form, such as a follow up message to a participant to the meeting, or perhaps an order for goods or services. Indeed, in such a situation, for many, the reversion to manual note taking with pad and paper is the consequence.

BRIEF SUMMARY OF THE INVENTION

Embodiments of the present invention address deficiencies of the art in respect to forms generation in mobile computing for a CRM system and provide a novel and non-obvious method, system and computer program product for touch screen interface utilization during forms generation in a CRM system. In an embodiment of the invention, a method for mobile touch screen interface utilization during forms generation in a CRM system includes logically subdividing into different discrete portions, a touch screen of a mobile computing device and associating each of the portions in memory of the mobile computing device with a particular record field for a multiplicity of different records in the CRM system. The method also includes selecting in the memory of the mobile computing device a particular one of the different records in the CRM system through the touch screen and receiving handwritten input on the touch screen and converting the handwritten input into computer recognizable text. Thereafter, the computer recognizable text is provided as text input to a field of the selected record corresponding to a portion of the touch screen in which the handwritten input is received. Finally, the method includes generating and displaying in the touch screen a form utilizing the text input of the field of the record in the CRM system.

In one aspect of the embodiment, the handwritten input on the touch screen is received through contact between the touch screen and a stylus. Alternatively, the handwritten input on the touch screen is received as an image of the handwritten input captured by a camera embedded in the mobile computing device. In another aspect of the embodiment, the form is a sales quotation utilizing the handwritten input as customized elements of the sales quotation. Alternatively, the form is a follow up message to a customer or potential customer utilizing the handwritten input as customized elements of the message. Finally, in yet another aspect of the embodiment, the form is transmitted electronically as part of an e-mail message to a customer or potential customer.

In another embodiment of the invention, a CRM data processing system is configured for mobile touch screen interface utilization during forms generation. The system includes a mobile computing device that has memory and at least one processor. The system also includes a touch screen disposed in the mobile computing device. Finally, the system includes a forms generation module executing in the memory of the mobile computing device. The module includes program code enabled to logically subdivide the touch screen into different discrete portions, to associate each of the portions in the memory of the mobile computing device with a particular record field for a multiplicity of different records in a CRM system communicatively coupled to the mobile computing device, to select in the memory of the mobile computing device a particular one of the different records in the CRM system through the touch screen, to receive handwritten input on the touch screen and to convert the handwritten input into computer recognizable text, to provide the computer recognizable text as text input to a field of the selected record corresponding to a portion of the touch screen in which the handwritten input is received, and to generate and display in the touch screen a form utilizing the text input of the field of the record in the CRM system.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for mobile touch screen interface utilization during forms generation in a CRM system. In accordance with an embodiment of the invention, a touch screen of a mobile computing device is logically subdivided into different discrete portions. Each portion of the logically subdivided touch screen is then associated with a particular record field for a multiplicity of different records in the CRM system. Thereafter, a particular one of the different records in the CRM system is selected through the touch screen interface and, as handwritten input is provided on the touch screen, the handwritten input is converted into computer recognizable text and provided as text input to a field of the selected record corresponding to a portion of the touch screen in which the handwritten input is received. Finally, a form is generated utilizing the text input of the field of the record in the CRM system and displayed in the touch screen.

Figure 1:
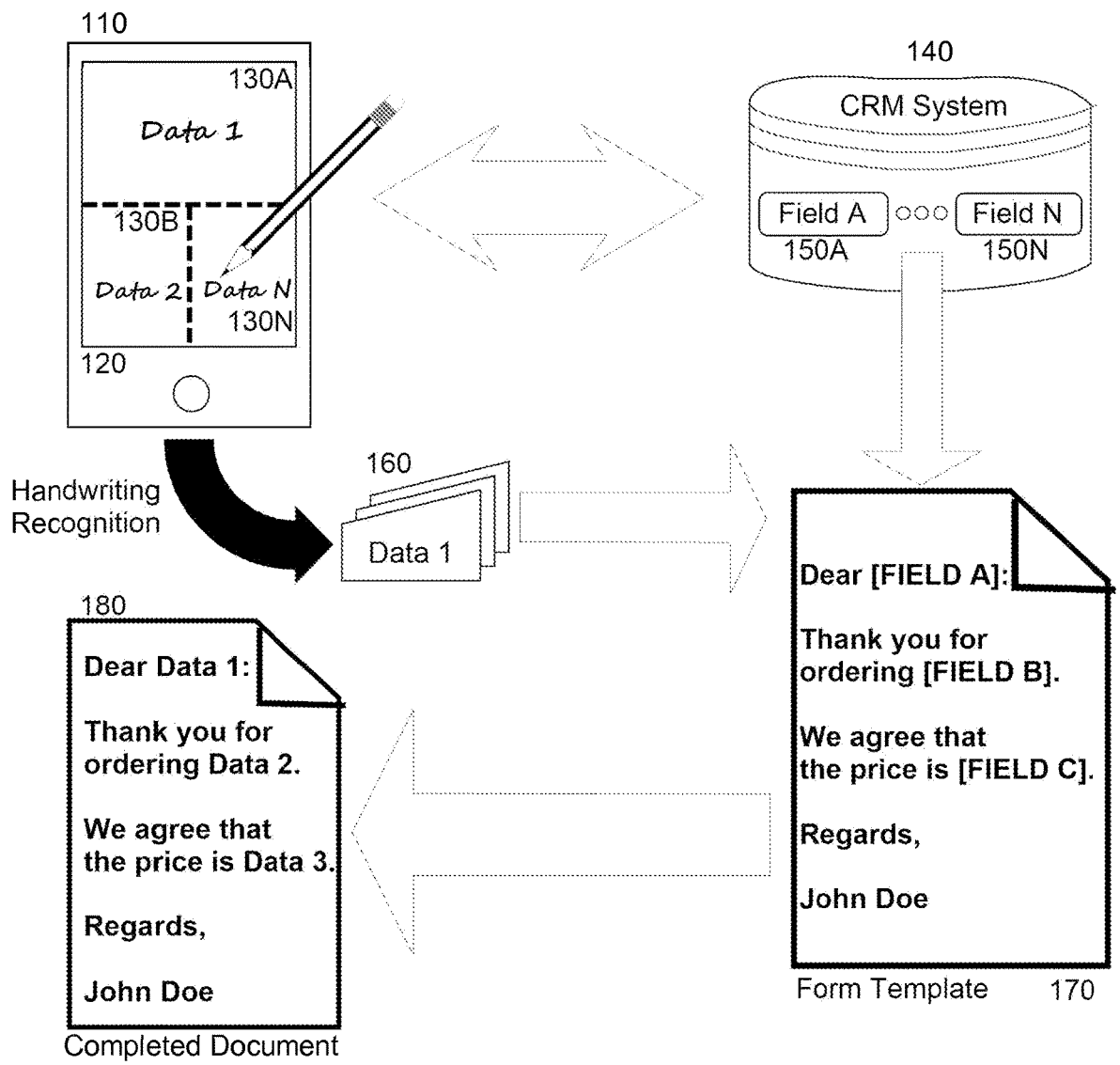
FIG. 1 is a pictorial illustration of a process for mobile touch screen interface utilization during forms generation in a CRM system.

In further illustration, FIG. 1 is a pictorial illustration of a process for mobile touch screen interface utilization during forms generation in a CRM system. As shown in FIG. 1, a touch screen display 120 of a mobile device is logically partitioned into different portions 130A, 130B, 130N. Each of the different portions 130A, 130B, 130N is then mapped to a field 150A, 150N of a record in a CRM computing system 140. Handwritten input is then received in the different portions 130A, 130B, 130N, whether through direct touch screen input, or by acquiring and displaying an image in the display 120. In either circumstance, the handwritten input in each of the portions 130A, 130B, 130N is recognized into textual data 160.

Thereafter, a template 170 is loaded into memory. The template 170 can be arranged to define a form of a message, a sales quotation or a sales order, to name a few examples. Regardless, the template includes different parameterized fields corresponding to the fields 150A, 150N of the CRM system 140. As such, the recognized textual data 160 mapped to the fields 150A, 150N is supplied as input to the template 170 so as to replace the parameterized fields with respective ones of the textual data 160 to produce form 180.

Figure 2:
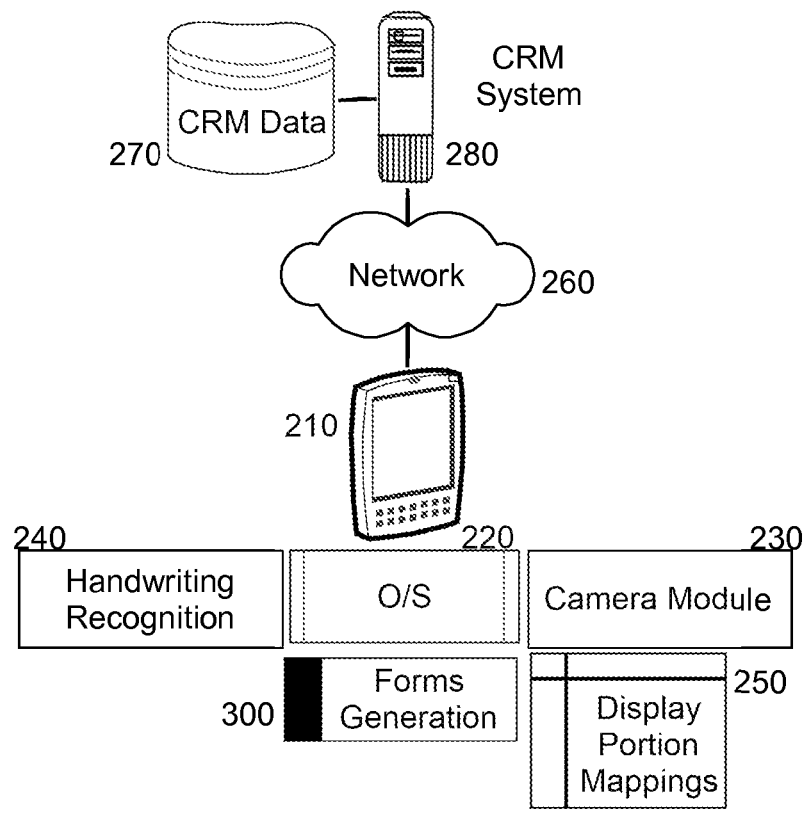
FIG. 2 is a schematic illustration of a CRM data processing system configured for mobile touch screen interface utilization during forms generation in a CRM system; and, FIG. 3 is a flow chart illustrating a process for mobile touch screen interface utilization during forms generation in a CRM system.

The process described in connection with FIG. 1 is implemented in a CRM data processing system. In yet further illustration, FIG. 2 schematically shows a CRM data processing system configured for mobile touch screen interface utilization during forms generation in a CRM system. The system includes a mobile computing device 210 such as a smartphone or tablet computing device. The mobile computing device 210 includes at least one processor and memory and supports the execution of an operating system 220 so as to host the operation of each of handwriting recognition logic 240, a camera module 230 and forms generation module 300.

The forms generation module 300 includes program code that when executes in the memory of the mobile computing device 210 is enabled to receive handwriting input in different logically defined portions of a touch screen of the mobile computing device 210. In this regard, the logically defined portions are portions of the touch screen of the display of the mobile computing device 210 defined by different locations on the touch screen that are mapped in a table 250 to different fields of one or more records in a CRM data store 270 of a CRM computing system 280 communicatively coupled to the mobile computing device 210 over computer communications network 260.

The program code is additionally enabled to direct the handwriting recognition logic 240 to recognize the handwriting to produce text in association with a field of the CRM data 270 mapped to a portion of the touch screen in which the handwriting had been received or appears in the event that the handwriting is provided by way of the camera module 230. The program code even further is enabled to load a template into memory of the mobile computing device 210 and to populate parameterized fields of the template with the handwriting recognized text so as to generate a completed form. Finally, the program code is enabled to display the completed form in the touch screen display. To the extent the completed form is a message, the program optionally can transmit the message to a specified recipient over the computer communications network 260.

Figure 3:
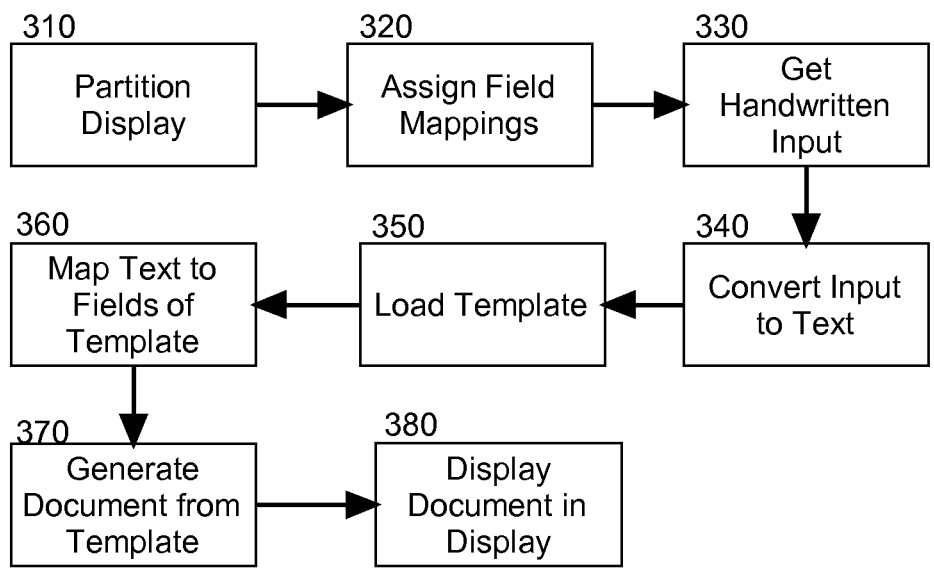

In even yet further illustration of the operation of the forms generation module 300, FIG. 3 is a flow chart illustrating a process for mobile touch screen interface utilization during forms generation in a CRM system. Beginning in block 310, a touch screen display of a mobile computing device is logically partitioned into different portions, and in block 320, each of the portions is mapped to a particular field of a record in a CRM data store. In block 330, handwritten input is received in different portions of the touch screen and the handwritten input is recognized into text in block 340. In block 350, a template is loaded into memory of the mobile computing device and in block 360, the text is used to replace parameterized fields in the template corresponding to the fields of the CRM data store mapped to the portions of the touch screen display in which the handwritten input was received and recognized into the text so as to generate a form in block 370. Finally, in block 380 the form is displayed in the touch screen of the mobile computing device.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for mobile touch screen interface utilization during forms generation in a customer relationship management (CRM) system, the method comprising:
  logically subdividing an entirety of a touch screen into a number of different discrete portions, the number corresponding to different numbers of fields of different ones of a multiplicity of different customer records of the CRM system, each of the fields of the different customer records being mapped to a corresponding one of the different discrete portions;
  associating each of the different discrete portions in memory of the mobile computing device with a particular record field for each of the multiplicity of different customer records in the CRM system so that every of each different discrete portion of the touch screen is associated with a corresponding particular field for each of the multiplicity of different customer records in the CRM system;
  selecting in the memory of the mobile computing device a particular one of the different customer records in the CRM system through the touch screen;
  displaying only partitions logically subdividing the touch screen on the entirety of the touch screen based on the selected customer record;
  receiving handwritten input in each of the logical subdivisions of the entirety of the touch screen and converting the handwritten input into computer recognizable text;
  providing the computer recognizable text as text input to a field of the selected customer record corresponding to a portion of the touch screen in which the handwritten input is received;
  subsequent to the receiving of the handwritten input in each of the logical subdivisions of the entirety of the touch screen, loading in the memory of the mobile computing device a particular template through the touch screen from different templates for the selected customer record in the CRM system wherein the different templates comprise a sales quotation template and a sales order template;
  generating and displaying in the touch screen a form follow up message to a customer of the selected customer record utilizing the text input of the field of the customer record in the CRM system wherein the form follow up message is a sales quotation utilizing the handwritten input as customized elements of the sales quotation when the sales quotation template is selected and the form follow up message is a sales order utilizing the handwritten input as customized elements of the sales order when the sales order template is selected; and,
  transmitting the form follow up message electronically as part of an e-mail message to the customer of the selected customer record.

2. The method of claim 1, wherein the handwritten input on the touch screen is received through contact between the touch screen and a stylus.

3. The method of claim 1, wherein the handwritten input on the touch screen is received as an image of the handwritten input captured by a camera embedded in the mobile computing device.

4. A customer relationship management (CRM) data processing system configured for mobile touch screen interface utilization during forms generation, the system comprising:
  a mobile computing device comprising memory and at least one processor;
  a touch screen disposed in the mobile computing device; and,
  a forms generation module executing in the memory of the mobile computing device, the module comprising program code enabled to logically subdivide an entirety of the touch screen into a number of different discrete portions, the number corresponding to different numbers of fields of different ones of a multiplicity of different customer records of the CRM system, each of the fields of the different customer records being mapped to a corresponding one of the different discrete portions, to associate each of the different discrete portions in the memory of the mobile computing device with a particular record field for each of the multiplicity of different customer records in a CRM system communicatively coupled to the mobile computing device so that every different discrete portion of the touch screen is associated with a corresponding particular field for each of the multiplicity of different customer records in the CRM system, to select in the memory of the mobile computing device a particular one of the different customer records in the CRM system through the touch screen, to display only partitions logically subdividing the touch screen on the entirety of the touch screen based on the selected customer record, to receive handwritten input in each of the logical subdivisions of the entirety of the touch screen and to convert the handwritten input into computer recognizable text, to provide the computer recognizable text as text input to a field of the selected customer record corresponding to a portion of the touch screen in which the handwritten input is received, subsequent to the receiving of the handwritten input in each the logical subdivisions of the entirety of the touch screen, to load in the memory of the mobile computing device a particular template through the touch screen from different templates for the selected customer record in the CRM system wherein the different templates comprise a sales quotation template and a sales order template, to generate and display in the touch screen a form follow up message to a customer of the selected customer record utilizing the text input of the field of the customer record in the CRM system wherein the form follow up message is a sales quotation utilizing the handwritten input as customized elements of the sales quotation when the sales quotation template is selected and the form follow up message is a sales order utilizing the handwritten input as customized elements of the sales order when the sales order template is selected, and to transmit the form follow up message electronically as part of an e-mail message to the customer of the selected customer record.

5. The system of claim 4, wherein the handwritten input on the touch screen is received through contact between the touch screen and a stylus.

6. The system of claim 4, wherein the handwritten input on the touch screen is received as an image of the handwritten input captured by a camera embedded in the mobile computing device.

7. A computer program product for mobile touch screen interface utilization during forms generation in a customer relationship management (CRM) system, the computer program product comprising a computer readable storage medium having program instructions embodied therewith, the program instructions executable by a device to cause the device to perform a method comprising:

logically subdividing an entirety of a touch screen into a number of different discrete portions, the number corresponding to different numbers of fields of different ones of a multiplicity of different customer records of the CRM system, each of the fields of the different customer records being mapped to a corresponding one of the different discrete portions;

associating each of the different discrete portions in memory of the mobile computing device with a particular record field for each of the multiplicity of different customer records in the CRM system so that every of each different discrete portion of the touch screen is associated with a corresponding particular field for each of the multiplicity of different customer records in the CRM system;

selecting in the memory of the mobile computing device a particular one of the different customer records in the CRM system through the touch screen;

displaying only partitions logically subdividing the touch screen on the entirety of the touch screen based on the selected customer record;

receiving handwritten input in each of the logical subdivisions of the entirety of the touch screen and converting the handwritten input into computer recognizable text;

providing the computer recognizable text as text input to a field of the selected customer record corresponding to a portion of the touch screen in which the handwritten input is received;

subsequent to the receiving of the handwritten input in each of the logical subdivisions of the entirety of the touch screen, loading in the memory of the mobile computing device a particular template through the touch screen from different templates for the selected customer record in the CRM system wherein the different templates comprise a sales quotation template and a sales order template;

generating and displaying in the touch screen a form follow up message to a customer of the selected customer record utilizing the text input of the field of the customer record in the CRM system wherein the form follow up message is a sales quotation utilizing the handwritten input as customized elements of the sales quotation when the sales quotation template is selected and the form follow up message is a sales order utilizing the handwritten input as customized elements of the sales order when the sales order template is selected; and, transmitting the form follow up message electronically as part of an e-mail message to the customer of the selected customer record.

8. The computer program product of claim 7, wherein the handwritten input on the touch screen is received through contact between the touch screen and a stylus.

9. The computer program product of claim 7, wherein the handwritten input on the touch screen is received as an image of the handwritten input captured by a camera embedded in the mobile computing device.

* * * * *